United States Patent [19]

Klassen et al.

[11] Patent Number: 4,685,942
[45] Date of Patent: Aug. 11, 1987

[54] AXIAL FLOW INLET PARTICLE SEPARATOR

[75] Inventors: David D. Klassen, Boxford; Roy E. Moyer, Danvers; Frank A. Lastrina, Andover; Robert P. Tameo, Peabody, all of Mass.

[73] Assignee: General Electric Company, Lynn, Mass.

[21] Appl. No.: 453,011

[22] Filed: Dec. 27, 1982

[51] Int. Cl.$^4$ ............................................. B01D 45/04
[52] U.S. Cl. ........................................ 55/306; 55/318; 55/396; 55/431; 55/459 B; 244/53 B; 137/15.1; 60/39.092
[58] Field of Search .................... 55/306, 318, 385 B, 55/431, 396, 430, 459 B; 244/53 B; 60/39.092; 415/121 G; 137/15.1

[56] References Cited

U.S. PATENT DOCUMENTS

| | | | |
|---|---|---|---|
| 2,482,642 | 9/1949 | Sylvan | 55/459 B |
| 2,498,832 | 2/1950 | Watson et al. | 55/431 |
| 2,893,510 | 7/1959 | Spann | 55/204 |
| 3,309,867 | 3/1967 | Ehrich . | |
| 3,338,049 | 8/1967 | Fernberger . | |
| 3,362,155 | 1/1968 | Driscoll . | |
| 3,444,672 | 5/1969 | Alsobrooks | 55/306 |
| 3,521,431 | 7/1970 | Connors et al. | 55/306 |
| 3,534,548 | 10/1970 | Connors | 55/306 |
| 3,541,768 | 11/1970 | Labadie | 55/459 B |
| 3,616,616 | 11/1971 | Flatt | 55/306 |
| 3,766,719 | 10/1973 | McAnally, III | 55/306 |
| 3,832,086 | 8/1974 | Hull, Jr. . | |
| 3,877,454 | 4/1975 | Axmann et al. | 55/430 |
| 3,921,906 | 11/1975 | Nye et al. | 239/127.3 |
| 3,977,811 | 8/1976 | Kuintzle, Jr. | 137/15.1 |
| 3,978,656 | 9/1976 | Murphy | 55/306 |
| 3,979,903 | 9/1976 | Hull, Jr. et al. | 55/306 |
| 4,265,646 | 5/1981 | Weinstein et al. . | |
| 4,291,530 | 9/1981 | Ballard | 60/39.092 |

FOREIGN PATENT DOCUMENTS

| | | |
|---|---|---|
| 12252 | 6/1980 | European Pat. Off. . |
| 1065561 | 4/1967 | United Kingdom . |
| 1070458 | 6/1967 | United Kingdom . |
| 1166733 | 10/1969 | United Kingdom . |
| 1286644 | 8/1972 | United Kingdom . |
| 1479023 | 7/1977 | United Kingdom . |
| 1525257 | 9/1978 | United Kingdom . |
| 2069053 | 4/1983 | United Kingdom . |
| 2069054 | 6/1983 | United Kingdom . |

OTHER PUBLICATIONS

ASME P82-GT-40, "Small Engine Inlet Air Particle Separator Technology", by H. L. Morrow and D. B. Cale.

Primary Examiner—David L. Lacey
Attorney, Agent, or Firm—Francis L. Conte; Derek P. Lawrence

[57] ABSTRACT

The invention is an improved inlet particle separator for removing extraneous matter from a stream of air directed into the engine's core section. The improved separator utilizes two stages of separation. The first stage is an axial flow separator for initially separating engine inlet air into a first flow of relatively contaminated air and a second flow of relatively clean air. This first stage of separation is accomplished by sharply turning the air flow radially inwardly so that the relatively dense extraneous matter continues in its original direction into a scavenge system. A second stage of separation is accomplished in the scavenge system and comprises a centrifugal separator that separates the first flow of air into third and fourth flows of relatively contaminated air for the purpose of protecting a blower that powers the flow through the scavenge system and which is in flow communication with only the relatively less contaminated fourth flow of air.

9 Claims, 5 Drawing Figures

AXIAL FLOW INLET PARTICLE SEPARATOR

BACKGROUND OF THE INVENTION

1. Field of the Invention

This invention relates to devices known as inlet particle separators that remove sand and extraneous matter from air entering gas turbine engines and more particularly to improved flowpath contours for inlet particle separators.

2. Background of the Prior Art

Aircraft gas turbine engines are highly susceptible to damage from foreign objects introduced into air inlets of such engines. The problem has been most acute in the past with respect to relatively large foreign objects, such as stones, gravel, birds, and hail.

With the advent of gas turbine-powered helicopters and other verticle takeoff and landing (VTOL) aircraft, smaller particles of foreign matter, such as sand and ice, have become increasingly troublesome due primarily to the conditions under which such VTOL aircraft are frequently operated. The advantage of VTOL capability makes such aircraft particularly useful in areas where conventional air fields do not exist, frequently occurring in uninhabited and isolated areas. VTOL aircraft are also specially suited for certain low-altitude missions over both land and sea.

Under these and other similar conditions, substantial quantities of small foreign objects, such as sand and ice, may become entrained in intake air supplied to the gas turbine engine. These foreign particles, which individually have relatively little effect on the engine, can cause very substantial damage when ingested into the engine in large quantities. As an example, recent experience has shown that engines in helicopters operating at low altitude in a desert environment can lose performance very rapidly due to erosion of the engine blading by the ingestion of dust and sand particles. Similar problems can occur when operating over salt water because of heavy ingestion of salt water droplets which can cause both corrosion and destructive erosion of turbine structures.

In attempting to solve this problem, various inlet particle separator systems have been developed for use with different kinds of gas turbine engines. As one might expect, continuing development has led to improvements and more effective separation systems. While some of these systems are highly effective at removing extraneous matter, they often involve drawbacks in terms of detrimental effects on engine performance.

One means of providing highly effective separation is to mount a blower system with an engine inlet that centrifuges the inlet air entrained with particles before the air enters the engine core. Once the air is accelerated to a high centrifugal velocity with the particles entrained therein, relatively clean air can be drawn from an inner portion of the centrifugal flow into the core engine itself. Because of its density, the extraneous matter itself cannot be drawn radially inwardly as quickly as the air and instead the particles will tend to follow their original trajectory around an outer radius into a collection chamber.

While this system efficiently separates extraneous matter, there can be certain disadvantages associated with the blower system and there can be performance disadvantages from powering the blower itself.

It is, therefore, an object of the present invention to provide an inlet particle separator flowpath that does not require centrifugal acceleration of engine inlet air in order to separate extraneous matter.

It is another object of the present invention to provide an improved engine inlet particle separator that efficiently separates extraneous matter without using large amounts of engine power in a blower system.

It is another object of the present invention to provide an inlet particle separator that efficiently and effectively separates extraneous matter from engine inlet air with a system that does not draw the bulk of the extraneous matter through a blower thereby avoiding problems of blower deterioration.

SUMMARY OF THE INVENTION

A gas turbine engine is provided with an improved inlet particle separator for removing extraneous matter from a stream of air directed into the engine's core section. The improved separator utilizes two stages of separation. The first stage is an axial separator, meaning the flow of air is accelerated in an axial direction, and thereafter the air flowpath turns sharply radially inwardly. This causes the extraneous matter, because of its greater density, to continue to flow axially while the air itself is more easily changed in direction and can be directed inwardly into the engine's core section.

The relatively contaminated air continues to flow in an axial direction into a collection chamber. Inside this collection chamber, a second stage of separation occurs. In the second stage, the separation is centrifugal and is powered by a blower. The blower accelerates the air in a centrifugal manner. Again, the extraneous matter, because of its higher density, will continue to flow in a direction of initial acceleration, causing the particles to be centrifuged in a radially outward direction. The blower is located in a radially inner section of the collection chamber so that the highly contaminated air bypasses the blower.

The air flowpath of the separator is unique in that a central hub forming its inner boundary is increased progressively and gradually in size to a hub maximum diameter while, at the same time, the air flow is being accelerated axially. Downstream of the hub maximum diameter is a separation section where the relatively clean core engine air is directed radially inwardly. A splitter nose separates the flow of relatively contaminated air from relatively clean air. To aid the separation process, the maximum diameter of the hub is at least greater than the diameter of the splitter nose. It has been shown that separation is particularly effective if the hub maximum diameter is more than ten percent greater than the splitter nose diameter.

DESCRIPTION OF THE DRAWING

While the specification concludes with claims distinctly claiming and particularly pointing out the invention described herein, it is believed that the invention can be more readily understood by reference to the following discussion and accompanying drawings in which:

DESCRIPTION OF THE PREFERRED EMBODIMENTS

Figure 1:
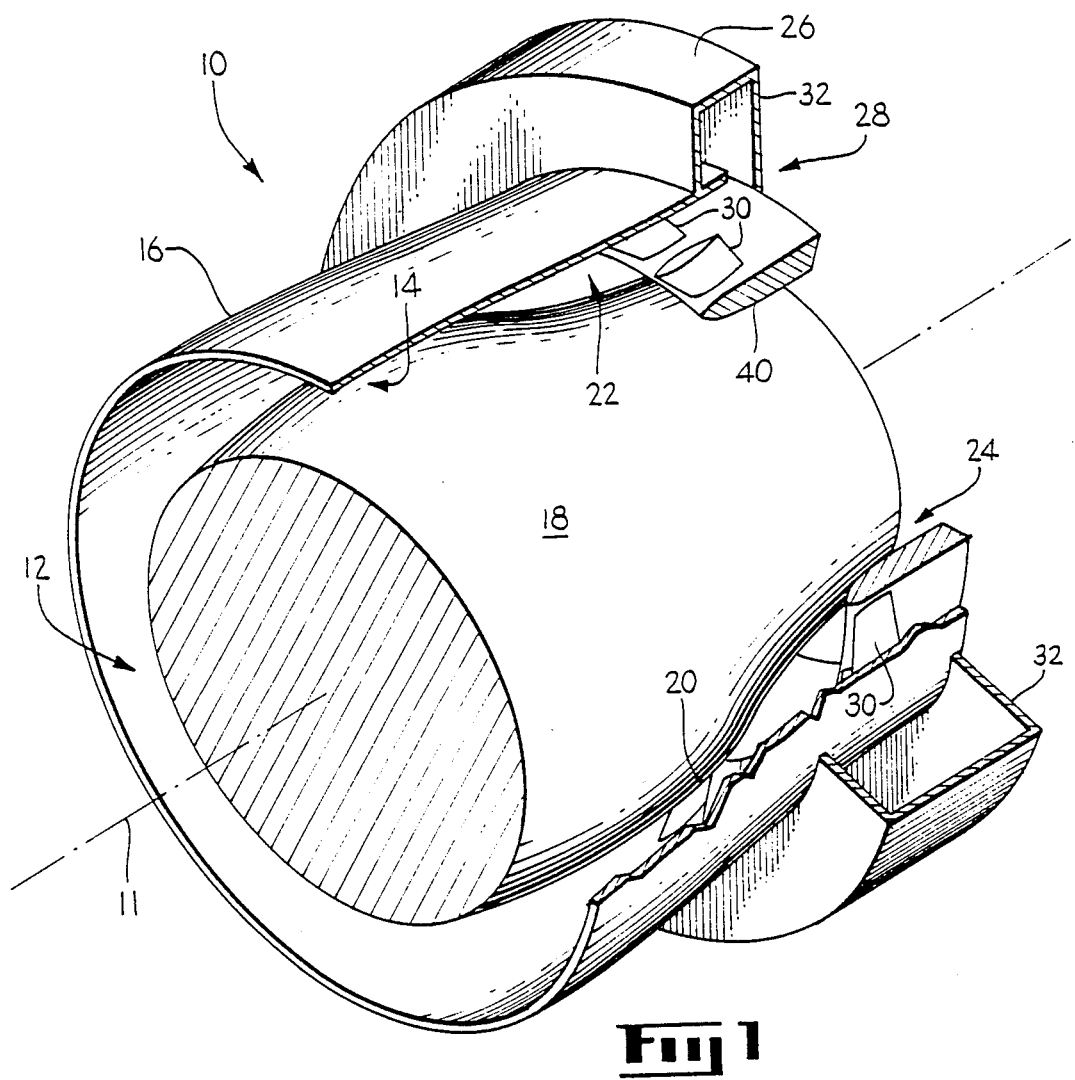
FIG. 1 is an elevation view, partly cut away, of an inlet particle separator.

Referring now to FIG. 1, an inlet particle separator 10 is shown which incorporates the various features of the present invention. This inlet particle separator 10 is a complete detachable unit that is designed to be mounted on the front end of an aircraft engine (not shown). An engine center line 11 is shown in FIG. 1 and this is also the center line for the inlet particle separator 10. The purpose of the inlet particle separator 10 is to separate extraneous matter from engine inlet air and direct the resulting relatively uncontaminated air into the engine's core.

Outside or inlet air is drawn into the inlet particle separator 10 through an annular inlet 12. From the inlet 12, the incoming air flows through an intake passageway section 14, the outer boundary of which is formed by an outer casing 16 and the inner boundary of which is formed by a hub section 18. It can be readily appreciated from viewing FIG. 1 that the diameter of the hub section 18 gradually increases in the downstream direction along the intake passageway 14. In addition, the diameter of the outer casing 16 also increases somewhat in this region.

While the manner and degree to which the hub section 18 increases in diameter through the intake passageway section 14 can be varied somewhat, there are certain design considerations that will be described later.

The diameter of the hub section 18 continues to gradually increase until it reaches a point of maximum diameter 20, whereafter the hub diameter quickly drops off or decreases. This portion of the inlet particle separator 10 where the diameter is decreasing can be described as a separation section 22. The separation section 22 is the region where extraneous matter in the engine inlet air physically separates from a second flow of relatively clean air that will eventually enter the engine's core (not shown). Separation of extraneous matter occurs in this region because the inlet air has been rapidly accelerated past the point of hub maximum diameter 20 and thereafter the air is rapidly turned radially inwardly to a compressor inlet 24.

The engine's compressor is not shown to avoid unnecessary detail, but its location would be immediately downstream of the designated location of the compressor inlet 24.

Returning again to the separation section 22, the momentum of the solid particles constituting the extraneous matter prevents those particles from turning with the air; therefore, the particles continue in an axial direction and enter a collection chamber 26 of a scavenge system 28. Once the extraneous matter has been directed into the scavenge system 28, particles are collected, and dumped overboard.

To achieve a high separation efficiency, the inlet particle separator 10 has a flowpath that is designed to "hide" the compressor inlet 24 from the extraneous matter entrained in the incoming air. Additionally, the scavenge system 28 has a collector system that is designed to reduce the probability of extraneous matter bouncing forward back into the compressor inlet 24 after striking structural elements of the scavenge system 28.

Scroll vanes 30 are mounted at the entrance to the scavenge system 28. The scroll vanes 30 are provided to turn the flow direction of the relatively contaminated air in a circumferential direction as it enters the scavenge system 28 including a scroll structure 32 mounted around the outer casing 16.

As the contaminated air enters the scroll 32, it accelerates in a circumferential direction, which causes the extraneous matter to accelerate radially outwardly towards the outside circumference of the scroll 32. This causes a second stage of separation in the form of a centrifugal separator, whereby the relatively contaminated air inside the scavenge system 28 is again separated into a third flow of highly contaminated air and a fourth flow of less highly contaminated air. Specifically, the third flow of highly contaminated air will be found in a radially outward section of the scroll 32 and the flow of less highly contaminated air will be found in a radially inward section of the scroll 32. A blower (not shown in FIG. 1) is provided to power the contaminated air through the scavenge system 28. The blower is mounted in such a way that only the fourth flow of less highly contaminated air flows through the blower itself thereby extending its operational life. The mounting of the blower will be described in greater detail later in this description.

Figure 2:
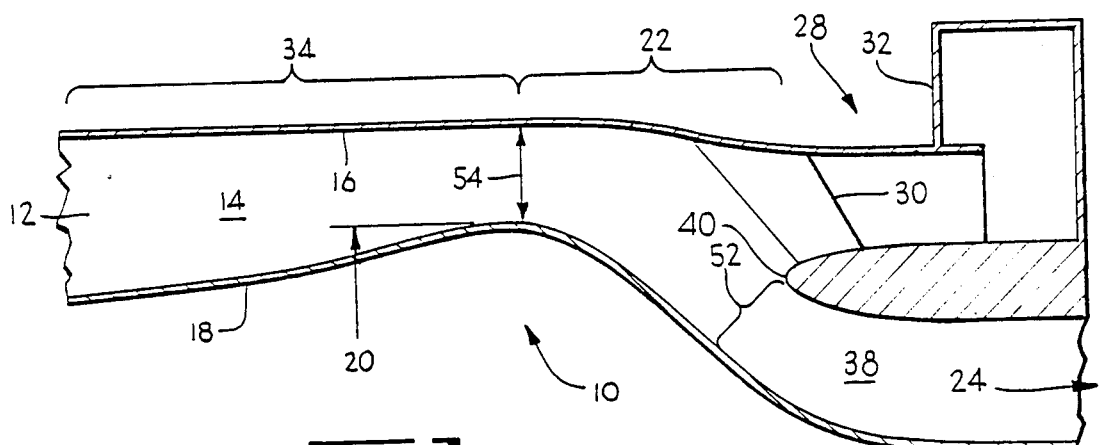
FIG. 2 is a cross-sectional view of a portion of the inlet particle separator shown in FIG. 1.

Referring now to FIG. 2, the inner flowpath of the air through an upper section of the inlet particle separator 10 is shown in cross section for the purpose of permitting a more detailed explanation of the separation process. It is immediately apparent that the separator shown is an axial flow-type separator and is vaneless, meaning no structural supports cross the inlet airstream. The vaneless feature of the inlet particle separator 10 allows an unimpeded inlet flowpath and eliminates any problems of drag on the inlet air flow caused by any intruding vane structures.

The inlet air, as noted earlier, enters the separator through the inlet 12. The internal flowpath is defined as having a radially outer boundary at the outer casing 16 and a radially inner boundary at the hub section 18. From the inlet 12, the hub section 18 begins to gradually increase in diameter and therefore the internal flowpath increases in radial distance from the engine center line. In the embodiment shown, this increase in diameter is gradual and progressive. It has been found that certain advantages accrue if the maximum slope of this increase does not exceed fifteen percent in relation to the center line. The diameter increases until the hub section 18 reaches a maximum diameter indicated at position 20 in FIG. 2. The position of this maximum hub diameter 20 is critical in relation to other portions of the inlet particle separator flowpath. It is important at this stage to realize that the air flow which contains various types of extraneous matter entrained therein has been accelerated as it progresses from the inlet 12 to the maximum hub diameter 20. This entire region of the flowpath from the inlet 12 to the hub maximum diameter has been designated earlier as the intake passageway section 14. While no separation takes place inside the intake passageway section 14, the inlet air is prepared for the actual separation process which begins to occur immediately downstream of the maximum hub diameter 20.

The next section has been referred to as the separation section 22. This is the region where a first stage of particle separation occurs within the inlet particle separator 10. From the point of maximum hub diameter 20, the flowpath changes drastically as the hub diameter rapidly decreases. In the same section 22, the outer casing 16 diameter decreases somewhat but not as rapidly as the diameter of the hub. It shall be appreciated by the reader that in the separation section 22, the flow of inlet air begins to divide into two separate flowpaths and two separate air flows. The first flow is located radially outward of the second flow. It must also be appreciated by the reader that downstream of the second flow of air in the inlet particle separator is the engine's compressor section (not shown) that was noted earlier. The engine's compressor, as the name suggests, compresses air and in the process draws in large volumes of air. This process greatly effects air flow upstream of the compressor and has an effect on air flow throughout the inlet particle separator 10. The general acceleration of inlet airflow begins at the inlet 12, continues through the intake passageway 14 and the maximum hub diameter 20, and thereafter causes the air to turn sharply radially inwardly towards the compressor inlet 24.

The compressor will generally draw the air radially inwardly without excessive losses in flow efficiency. On the other hand, the extraneous matter which is entrained in the inlet air flow is made up of solid particles and is naturally much more dense than the gas flow stream within which it is entrained. Because it is more dense (greater mass per unit of volume), the momentum of the extraneous matter will cause the particles to have a greater tendency to continue in their original direction of flow and will not make the sharp turn radially inwardly after the maximum hub diameter 20 as will the air itself. Therefore, the extraneous matter will tend to continue in an axial direction and will enter the scavenge system 28. A splitter nose 40 separates the flowpath into a scavenge system 28 and a core engine flowpath 38.

The relative radial position of the maximum hub diameter 20 in relation to the splitter nose 40 can be very critical. In order to promote effective separation, the radial location of the maximum hub diameter 20 must be greater in relation to engine center line than the radial location of the splitter nose 40. It has been found that desirable separation characteristics are achieved if the radial position of the maximum hub diameter 20 exceeds the radial position of the splitter nose 40 by ten percent or more of the splitter nose radius in respect to engine center line.

As the relatively contaminated air enters the scavenge system 28, it flows past a circumferential array of scroll vanes 30. As stated earlier, the scroll vanes are provided to cause the relatively contaminated air flow to be turned in a circumferential direction as it enters the scroll 32. Inside the scroll 32, the scavenge system 28 collects the extraneous matter particles in order to dump those particles overboard. By turning the relatively contaminated air in a circumferential direction, it is possible to cause a second stage of separation in the form of a centrifugal separator within the scavenge system 28. It is desirable to provide a second stage of separation in order to protect elements mounted within the scavenge system 28. More specifically, the scavenge system shown utilizes a blower for drawing air through the scavenge system. It is desirable to mount this blower in a portion of the scroll 32 that is subjected to a fourth flow of less highly contaminated air. In this manner, the blower elements, such as impeller blades, will not be deteriorated by constant impingement of sand and dirt particles. A more complete description of this blower system will be described later.

Returning to the separation section 22 of the flowpath, the inlet air is split into the two streams by the splitter nose 40. It has been found that one embodiment of a workable system will direct eighty percent of the inlet air flow into the core engine flowpath 38 and the compressor inlet 24. This is the relatively uncontaminated air flow. The remaining 20 percent of the inlet air, which is the highly contaminated air, is directed into the scavenge system 28 and on into the scroll 32.

Figure 3:
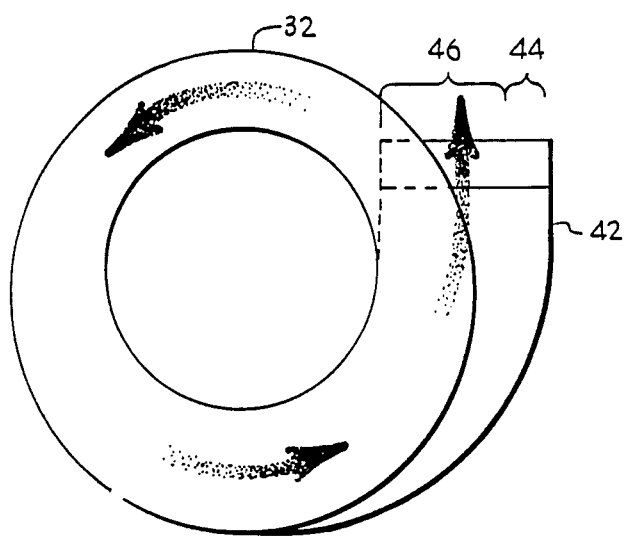
FIG. 3 is a cross-sectional view of a scavenge collection scroll for an inlet particle separator.

Referring now to FIG. 3, one embodiment of a scroll 32 is shown. This embodiment is a single direction scroll, meaning that the air flow entering the scroll flows in a single direction only. Referring briefly to FIG. 1, the scroll shown in that figure is a single direction scroll. Referring back to FIG. 3, once the highly contaminated air enters the scroll 32, it is caused by the scroll vanes 30 (not shown in FIG. 3) to flow circumferentially. The air continues through the length of the scroll and finally leaves the scroll through a simple duct 42 which connects to an engine-driven blower. It can be appreciated by the reader that as the highly contaminated air flow is caused to flow circumferentially, the relatively dense extraneous matter will tend to collect around the outer radius of the scroll 32. Therefore, the radially outer portion shown at 44 will contain a third flow of highly contaminated air. Conversely, the radially inner flow shown at 46 will contain a fourth flow of less highly contaminated air.

Figure 5:
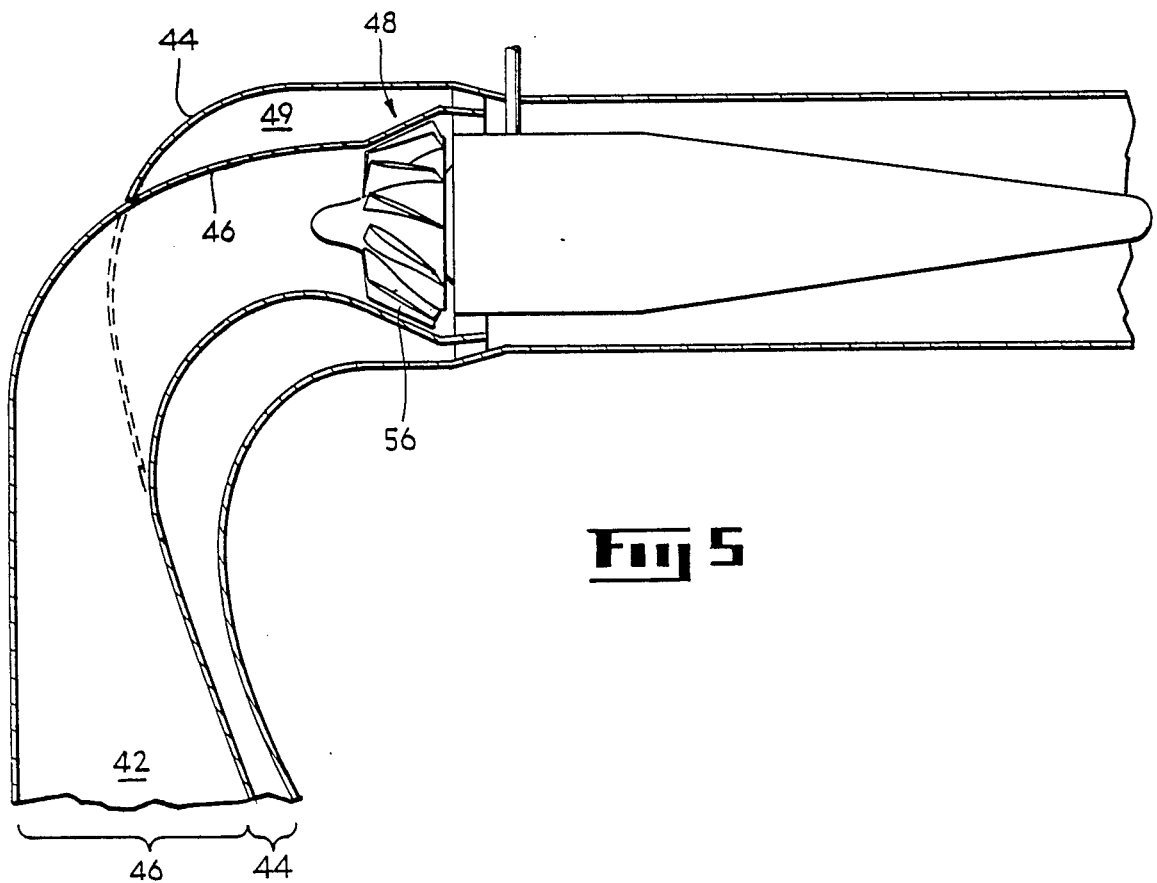
FIG. 5 is a cross-sectional view of a portion of a scavenge collection scroll and a bypass blower for an inlet particle separator.

Referring now to FIG. 5, the duct 42 is shown as being split into a radially outer portion 44 and a radially inner portion 46. The lower portion of the duct 42 as shown in FIG. 5 would be connected to the downstream end of the duct as shown in FIG. 3. At the upper portion of the duct 42, the duct outer portion 44 and inner portion 46 are spaced from each other for defining therebetween a a bypass duct or means 49. Again, the flow of air entering the radially outer portion 44 of the duct 42 will be the third flow of highly contaminated air. Once the flow is separated in this fashion, it is a relatively simple matter to mount the blower 48 inside the radially inner portion 46 of the duct 42 so that the blower and its impeller blades 56 are not subjected to the highly contaminated flow of air which will be channeled around the blower 48 through the bypass duct 49. This will protect the blower impeller blades and lead to longer blower life.

Figure 4:
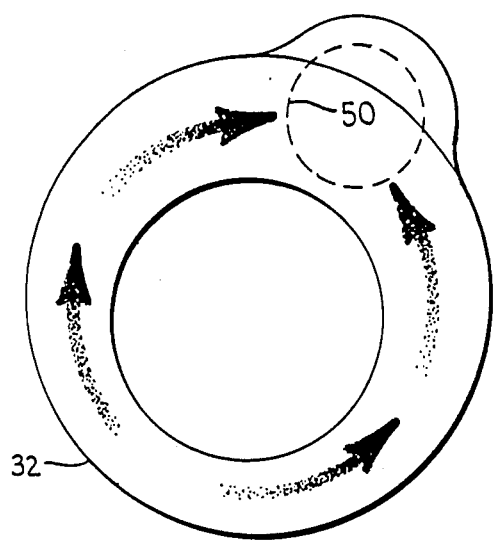
FIG. 4 is an alternate embodiment of a scavenge collection scroll for an inlet particle separator.

Referring now to FIG. 4, an alternate embodiment for the scroll 32 is shown. This alternate embodiment provides for a dual or split flow of air through the inside of the scroll in two opposing centrifugal directions. It can be argued that by dividing or splitting the flow of air through the scroll 32, a lower pressure loss is achieved, thus decreasing the amount of power required by the blower to power the scavenge system 28. An exit passage 50 from the scroll 32 is shown in FIG. 4 in dashed lines. This exit 50 can be mounted closer to the radially inner portion of the scroll 32 and thereby avoid the highly contaminated flow which will collect around the radially outer portions of the scroll 32. Again, the blower can be mounted inside a duct downstream of the exit 50 in a manner such that the blower will be subjected to a less highly contaminated flow of air.

Referring again to FIG. 2, some unique advantages of the flowpath in the inlet particle separator shown can now be described. Because of the relatively large circumferance of the hub section 18, especially at the maximum hub diameter 20, the hub provides a very useful section of space that can be utilized for a variety of functions. One such function is to use the inside of the hub section 18 as a location for power extraction from the engine which might be done in the form of an engine shaft and gearbox. It is highly desirable to provide for a power source from the engine near the engine intake at the forward most section of the engine in many typical engine applications.

Also, it should be noted that another advantage of the air flowpath through the embodiment of the inlet particle separator shown, which greatly increases the efficiency of the separation in the separation section 22, is the relative axial (as opposed to radial) location between the splitter nose 40 and the hub 18 at its maximum diameter 20. The axial space between the splitter nose 40 and the hub at its maximum diameter 20 can be described as a core capture area designated at 52 in FIG. 2. The core capture area is the area normal to the flow of the splitter nose 40 which provides for inlet air to enter the core engine flowpath 38 and thereafter the core engine itself.

Correspondingly, the cross-sectional area of the flowpath between the outer casing 16 and the hub section 18 at the position of maximum hub diameter 20, can be described as a transition flowpath area and is indicated at 54 in FIG. 2.

The ratio of the core capture area 52 to the transition flowpath area 54 can be important for promoting good separation inside the separation section 22. It has been found that good separation characteristics are achieved when the splitter nose 40 is displaced in respect to the hub section 18 at such a distance that the flowpath area therebetween or core capture area is generally equal to or less than 50 percent of the transition flowpath area 54 at the hub maximum circumference 20.

While the core capture area 52 could be a good deal less than 50 percent of the transition flowpath area 54, it has generally been found that while good separation is achieved, this can cause problems in directing sufficient volumes of air into the core engine flowpath 38.

While specific embodiments of the present invention have been described, it will be apparent to those skilled in the art that various modifications thereto can be made without departing from the scope of the invention as recited in the appending claims.

Having described the invention, what is claimed as novel and desired to be secured by Letters Patent of the United States is:

1. An inlet particle separator for a gas turbine engine comprising:
   an axial flow separator for initially separating engine inlet air into a first flow of relatively contaminated air and a second flow of relatively clean air;
   a scavenge system in flow communication with said axial flow separator and effective for receiving said first flow of relatively contaminated air, and including:
   a centrifugal separator for separating said first flow of air into a third flow of highly contaminated air at a radially outer portion thereof and a fourth flow of less highly contaminated air at a radially inner portion thereof;
   blower means effective for drawing air through said scavenge system and disposed in flow communication with only said radially inner portion of said centrifugal separator for receiving said fourth flow of air; and
   bypass means in flow communication with said radially outer portion of said centrifugal separator for channeling said third flow of air around said blower means to be dumped overboard.

2. The inlet particle separator recited in claim 1 wherein said centrifugal separator includes an annular collection chamber flowpath positioned and arranged for receiving said first flow of air, a plurality of circumferentially spaced scroll vanes disposed in said collection chamber flowpath, and a scroll structure disposed in flow communication with said collection chamber flowpath, and scroll vanes bein positioned and arranged for splitting the first flow of relatively contaminated air in the centrifugal separator in two opposing circumferential directions in said scroll structure.

3. An inlet particle separator according to claim 1 wherein said axial flow separator has an air flowpath comprising:
   an intake passageway having an inner boundary and an outer boundary defined by a hub and an outer casing spaced conventrically therearound, respectively, and wherein said hub has a hub diameter that progressively increases from an inlet disposed at an upstream end of said axial flow separator to a maximum hub diameter;
   a separation section in flow communication with said intake passageway wherein said hub diameter progressively decreases;
   a splitter nose in said separation section that, with respect to said outer casing and said hub, defines a collection chamber flowpath and a core engine flowpath, respectively, said splitter nose being effective for separating engine inlet air into said first flow of relatively contaminated air in said collection chamber flowpath and said second flow of relatively clean air in said core engine flowpath; and
   said hub maximum dimeter being positioned readially outward of said splitter nose.

4. The inlet particle separator recited in claim 3 wherein said hub maximum diameter exceeds a diameter of said splitter nose by at least ten percent of said spitter nose diameter.

5. The inlet particle separator recited in claim 3 wherein said hub diameter between said inlet and the location of said hub maixmum diameter has a maximum slope in relation to an aixal central line thereof of fifteen percent.

6. The inlet particle separator recited claim 3 wherein said splitter nose is displaced in respect to said hub in the separtor sections so as to form a flowpath area therebetween that is fifty percent or less than a transition flowpath area in the intake passageway at the location of the hub maximum diameter.

7. An inlet particle separator adapted to be mounted to a front end of a gas turbine engine and coaxially about an axial center line thereof comprising:
   a generally cylindrical outer casing aligned coaxially with said center line;
   an annular hub section aligned coaxially with said center line and spaced radially inwardly of said outer casing, said hub section including an upstream portion of increasing diameter and a downstream portion of decreasing diameter and a postion of hub maximum diameter joining said upstream and downstream portions, said upstream portion and said outer casing defining an intake passageway therebetween, and said downstream portion and said outer casing defining a separation section therebetween in flow communication with said intake passageway, said upstream portion having a slop relative to said center line of less than about fifteen percent;

an annular splitter member disposed between said outer casing and said downstream portion of said hub section, said hub maximum diameter being at least ten percent greater than a diameter of said splitter member, said splitter member and said outer casing defining a collection chamber flowpath therebetween for receiving a first flow of relatively contaminated air from said intake passageway, and said splitter member and said downstream portion of said hub section defining therebetween a core engine flowpath for receiving a second flow of relatively clean air from said intake passageway; and scavenge system means disposed in flow communication with said collection chamber flowpath for removing said first flow of relatively contaminated air therefrom including including:

a plurality of circumferentially spaced scroll vanes disposed in said collection chamber flowpath for turning said first flow of air in a circumferential direction;

an annular scroll structure extending from said outer casing in flow communication with a discharge end of said collection chamber flowpath for accelerating said first flow of air in said circumferential direction to separate said first flow into a third flow of highly contaminated air at a radially outer portion of said scroll structure and a fourth flow of less contaminated air at a radially inner portion of said scroll structure;

blower means effective for drawing air through said scavenge stystem and disposed in flow communication with only said radially inner portion of said scroll structure for receiving said fourth flow of air; and bypass means in flow communication with said radially outer portion of said scroll structure for channeling said third flow of air around said blower means to be dumped overboard.

8. An inlet particle separator according to claim 7 wherein said outer casing and said position of hub maximum diameter define a transition flowpath area therebetween, said splitter member and said downstream portion of said hub section define a core capture area therebetween being less than about fifty percent of said transition flow area, and said collection chamber flowpath and said core engine flowpath being sized so that said first and second flows of air represent about twenty percent and about eightly percent, respectively, of air flowable through said intake passageway.

9. An inlet particle separator according to claim 7 wherein said scroll vanes are positioned and arranged for splitting said first flow of air into two opposing circumferential directions in said scroll structure.

* * * * *